United States Patent [19]

Schreurs

[11] 4,058,639
[45] Nov. 15, 1977

[54] METHOD OF MAKING FLUORESCENT LAMP

[75] Inventor: Willy P. Schreurs, Danvers, Mass.

[73] Assignee: GTE Sylvania Incorporated, Danvers, Mass.

[21] Appl. No.: 639,029

[22] Filed: Dec. 9, 1975

[51] Int. Cl.² .................. B05D 1/36; B05D 5/06; B05D 7/22
[52] U.S. Cl. ............................... 427/67; 427/157
[58] Field of Search .............. 427/67, 106, 157; 106/195; 428/432, 438, 439; 313/221

[56] References Cited

U.S. PATENT DOCUMENTS

| | | | |
|---|---|---|---|
| 2,337,524 | 12/1943 | Michael | 427/67 |
| 2,709,766 | 5/1955 | Nagy | 427/67 |
| 2,858,234 | 10/1958 | Ishler | 427/67 |
| 3,083,115 | 3/1963 | Baeder | 106/195 |
| 3,141,990 | 7/1964 | Ray | 313/221 |
| 3,514,276 | 5/1970 | Fujio | 427/67 |
| 3,541,377 | 11/1970 | Nagy | 427/106 |
| 3,599,029 | 8/1971 | Martyny | 313/221 |
| 3,700,479 | 10/1972 | Arents | 427/67 |
| 3,845,343 | 10/1974 | Hammer | 313/221 |
| 3,875,454 | 4/1975 | Van der Wolf | 427/67 |

Primary Examiner—James R. Hoffman
Attorney, Agent, or Firm—James Theodosopoulos

[57] ABSTRACT

A film of colloidal alumina is deposited on a fluorescent lamp envelope from a suspension containing nitrocellulose resin. After the film has dried, a phoshor coating is deposited thereon without the need of baking the film.

4 Claims, No Drawings

METHOD OF MAKING FLUORESCENT LAMP

THE INVENTION

This invention relates to protective films of alumina applied to fluorescent lamp glass envelopes.

It is well known that the light output and maintenance of fluorescent lamps deteriorate because of a progressive darkening of the bulb during the operating life of the lamp. The darkening is commonly attributed to amalgamation of sodium on the inner surface of the glass under the influence of ultraviolet radiation from the arc discharge.

In the case of aperture lamps, shown, for example, in U.S. Pat. No. 3,225,241 where the phosphor does not cover the entire periphery of the bulb, the aperture portion of the glass is not coated with phosphor and is, therefore, subject to the full impact of the various ultraviolet radiations; hence, a sever blackening can occur on the portion of the lamp where it is most detrimental.

In a special type of fluorescent lamp, the inner surface of the glass bulb is mode electroconductive by deposition thereon of a thin layer of metal oxide, for example, tin oxide or indium oxide; an example of such a lamp is shown in U.S. Pat. No. 3,676,729. In these lamps the darkening is compounded by the possible formation of the corresponding black metallic oxides.

Although several types of protective films have been disclosed to alleviate the darkening problem, the preferred coating is alumina because of its chemical stability and very high light transmission. Such almina films are disclosed in U.S. Pat. Nos. 3,141,990 and 3,599,029. The former uses a dispersion of alumina in an ethylcellulose vehicle; the latter uses a solution of organo-metallic titanium in conjunction with relatively coarse alumina.

In U.S. Pat. No. 3,617,357, the protective film is made of rod-shaped gamma alumina resulting from the transformation of boehmite fibrils under the action of heat. In U.S. Pat. No. 3,845,343 the coating is prepared from alumina S butoxide with an ethylcellulose binder.

All the methods using ethylcellulose as a binder have a major drawback in that they require a lehring operation before the phosphor can be deposited thereon, expecially if the phosphor coating contains a solvent for ethylcellulose, as is often the case.

It is the purpose of this invention to provide a method for depositing a protective alumina film on a fluorescent lamp envelope that eliminates the need of lehring prior to deposition of the phosphor coating.

As is known, finely powdered alumina forms a reasonably well dispersed coating in an ethylcellulose vehicle for which the preferred solvent is xylene or other nonpolar solvent. However, acceptable coatings of finely powdered alumina in nitrocellulose vehicles have not been heretofore produced.

I have found that finely powdered alumina can be dispersed in a highly polar solvent, such as 2-ethoxyethanol. The dispersion is prepared in a high speed blender or colloid mill by mixing the alumina with 2-ethoxyethanol containing a small amount of ampholytic surfactant. The surfactant achieves the dual purpose of facilitating the dispersion and the formation of a smooth, continuous and adherent film in the subsequent coating operation.

In a specific example according to the invention, 38 grams of finely powdered alumina, having an average particle size of about 0.02 microns, along with 380 milliliters of 2-ethoxyethanol and 5 milliliters of G-3780A surfactant were subjected to 15 minutes of high speed agitation in a Waring blender. G-3780A surfactant is made by Atlas Chemical Industries and is a polyoxyethylene alkylamine which is insoluble in most hydrocarbon solvents but is soluble in lower alcohols, acetone, ethylene glycol and 2-ethoxyethanol.

The resulting dispersion is a milky, homogeneous liquid which appears quite stable after several days.

The alumina coating is preaprved by low-speed mixing of 100 ml of the above dispersion with 100 ml of a nitrocellulose vehicle that consists of 5.5% by volume of dry nitrocellulose in 2-ethoxyethanol. Then, in order to obtain a coatable composition, an additional 664 ml of 2-ethoxyethanol along with 7 ml of diethyl phthalate are added to the coating preparation.

The coating is applied to the lamp envelope by a down flushing operation or any other type of coating process known in the art. After drying, the deposited alumina film is overcoated with a phosphor suspension in a ethylcellulose system or in a water dispersed system without the usual intemediate lehring step that is common to alumina coatings using ethylcellulose as a binder.

in a comparison of alumina coatings according to this invention with alumina coatings using ethylcellulose binder, it was found that for an equivalent optical density the following ratios were required.

|  | $Al_2O_3$ in Nitrocellulose Vehicle | $Al_2O_3$ in Ethylcellulose Vehicle |
|---|---|---|
| $Al_2O_3$ concentration | 14.5 mg/ml | 25.6 mg/ml |
| Dry binder | 8.1 mg/ml | 200 mg/ml |
| Ratio $\frac{Dry\ Binder}{Al_2O_3}$ | 0.56 | 7.81 |

The much lower ratio of dry binder to alumina for this invention shows that the alumina film is more compact that the alumina film from an ethylcellulose vehicle. Since the efficiency of a protective film varies with the compactness thereof, the alumina film of this invention is superior to the ethylcellulose-based alumina film.

I claim:

1. The process of manufacturing a fluorescent lamp of the type having a protective coating on the inner surface of the lamp envelope and a phosphor coating deposited on the protective coating comprising the steps of preparing a dispersion of finely powdered alumina in a solution of nitrocellulose in a highly polar solvent, the dispersion containing no phosphor, applying said dispersion to the inner surface of the lamp envelope to form said protective coating, drying said protective coating and depositing said phosphor coating thereon without first lehring the protective coating.

2. The process of claim 1 wherein said dispersion also includes an ampholytic surfactant.

3. The process of claim 2 wherein said ampholytic surfactant is an ethoxylated amine.

4. The process of claim 1 wherein said highly polar solvent is 2-ethoxyethanol.

* * * * *